Feb. 13, 1945. T. R. ROBINSON ET AL 2,369,253
CLIPPER FOR SHEET MATERIAL
Filed June 14, 1943 3 Sheets-Sheet 2
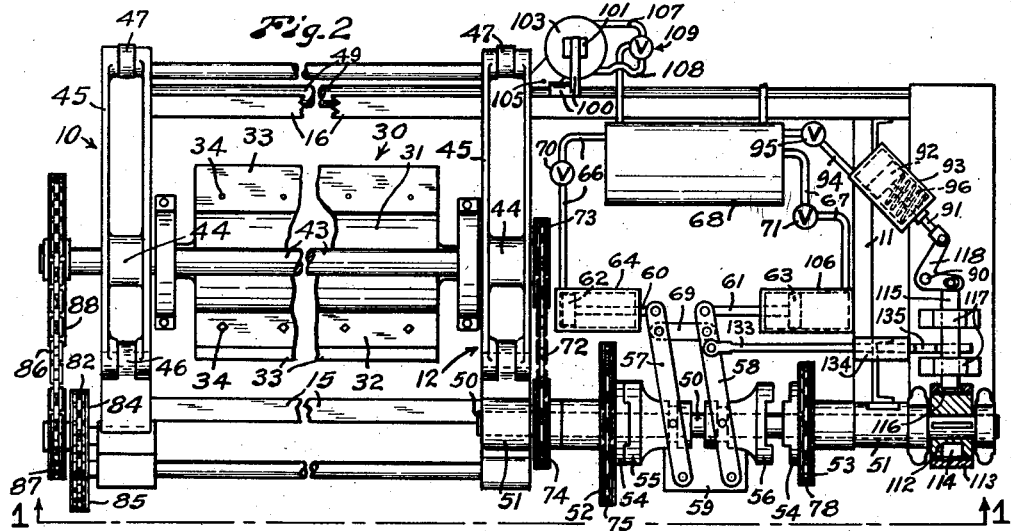
Fig. 2
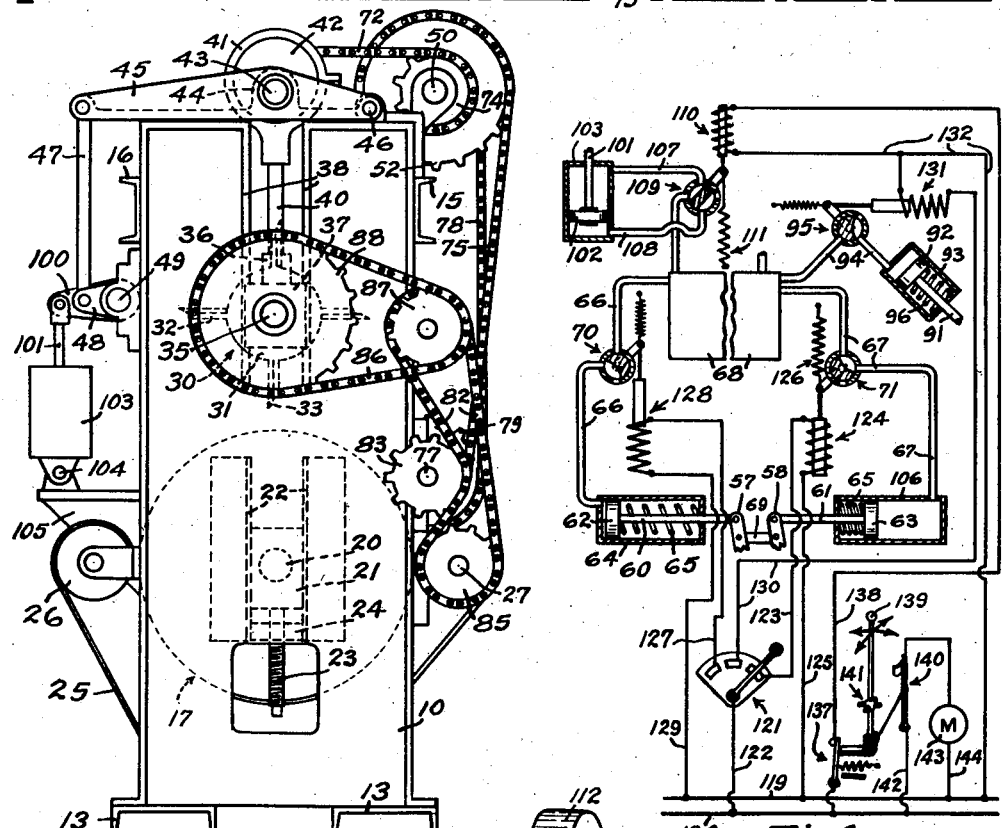
Fig. 3 Fig. 6
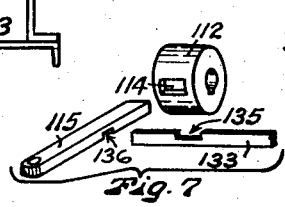 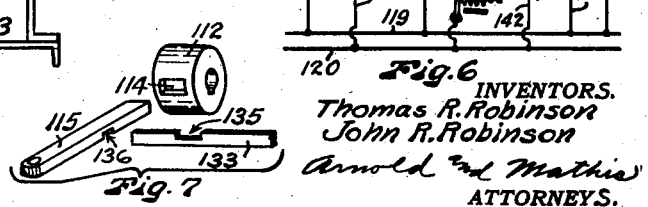
Fig. 7
INVENTORS.
Thomas R. Robinson
John R. Robinson
Arnold and Mathis
ATTORNEYS.

Feb. 13, 1945.   T. R. ROBINSON ET AL   2,369,253
CLIPPER FOR SHEET MATERIAL
Filed June 14, 1943   3 Sheets-Sheet 3

INVENTORS.
Thomas R. Robinson
John R. Robinson
BY Arnold and Mathis
ATTORNEYS.

Patented Feb. 13, 1945

2,369,253

UNITED STATES PATENT OFFICE 2,369,253

CLIPPER FOR SHEET MATERIAL

Thomas R. Robinson and John R. Robinson, Everett, Wash.

Application June 14, 1943, Serial No. 490,780

5 Claims. (Cl. 164—68)

This invention relates to clipping machines for cutting up relatively long sheets of traveling material into pieces of predetermined width.

The embodiment of this machine herein disclosed is particularly well adapted for use in clipping of veneer that is to be used in the manufacture of plywood, but it will be understood that the description of the invention as to its application in the plywood art is illustrative and not a limitation of the invention.

In the plywood art a log is placed on a lathe and a sheet of veneer is turned or peeled from the log. The first veneer delivered from a log generally has ragged edges or other ragged or torn portions and it is necessary to hand clip the sheet of veneer to salvage portions usable for making plywood. Also, some of the portions which are not usable in making plywood are sufficiently clear so they may be salvaged for chip stock in the cellulose art. Still other portions will have defects which will render such portions merely waste stock for burning. Often when the veneer sheets start to run complete it may be that surface checks or knots or other defects are present so that the veneer sheet is usable only for cross banding stock. Often the stock will be sufficiently clear to cut full width pieces for face stock and often half width pieces may be practically cut from the veneer stock.

From the foregoing described condition various width pieces of stock are cut from time to time. For example, the width of the stock used to make chips may be 13" in width and also the stock to be used as cross banding stock may be 13" in width. Also, pieces to be used for face stock may be 26" in width or 52" in width. The foregoing mentioned inches of 13, 26, and 52 are those now commercially employed in connection with plywood which will finish, after dressing, to 48" in width and are thus obviously mere examples.

It is an object of this invention to provide an automatic veneer clipper that may be supplemented by a manually operable or hand controlled clipper (commonly referred to as a hand clipper) in the line of production along which a sheet of veneer is traveling to permit the operator to selectively hand clip where the same is commercially necessary and to permit the operator to selectively control the operation of the automatic clipper so that clips may be made at predetermined widths such as 13", 26", or 52".

In the plywood art, the conveyor mechanism is controlled by the operator of the hand clipper so that travel of the conveyor may obtain for a predetermined length and then the operator may clip the veneer while the same is stationary. Then the operator, by operation of the commonly termed jogging lever, may intermittently advance or stop the travel of the veneer sheet to permit the operator to cut out defective portions and cut the veneer to desired widths and thus provide commercially usable pieces and the greatest number of those having the greatest value.

It is an object of this invention to permit the operator to intermittently advance and stop the conveyor mechanism and hand clip the veneer at desired spaced locations when such procedure, in the judgment of the operator, is the most commercially feasible procedure and also to permit the operator to automatically cut or clip the veneer stock and while the stock is traveling at an accelerated and continuous speed to desired widths such as 13", 26", or 52".

It is a further object of this invention to permit clipping at accelerated speeds of travel of the conveyor over those heretofore commonly employed. Manually controlled veneer clippers now in common use for clipping veneer peeled from logs are commercially limited to a speed of about 135 lineal feet of veneer per minute. This limitation is due primarily to the inability of an operator to select locations of cutting and to operate the machine at a faster speed. In an embodiment of our automatic clipping mechanism speeds of over 225 lineal feet a minute have been found entirely practical.

It is an object of this invention to provide a veneer clipper comprising a rotary cutter having knives moving in the same direction and at the same speed as the traveling veneer and further having means for reciprocably moving said rotary cutter toward and away from and the knives thereon into and out of cutting positions relative to the traveling veneer.

It is a further object of this invention to synchronize the reciprocable movement of the rotary cutter and the rate of travel of the veneer so that selected predetermined knives will be in a proper position for cutting at the time the rotary cutter is closest to the veneer and the width of the veneer pieces cut will thus be determined by the speed of reciprocation of the rotary cutter.

It is a further object of this invention to provide cutting knives operable in a predetermined circle tangentially adjacent traveling veneer and to provide relative reciprocable movement between the said knives and the said veneer to move a selected knife or knives into or out of cutting positions.

Another object of the invention is to provide a veneer clipper of simple and efficient construction that is capable of high speed operation to cut up veneer into narrow pieces and without reciprocating the rotary cutter member.

The above mentioned general objects of this invention, together with others inherent in the same, are attained by the mechanism illustrated in the following drawings, the same being a preferred exemplary form of embodiment of this invention, throughout which drawings like reference numerals indicate like parts:

Fig. 2 is a top plan view of the structure shown in Fig. 1 with a portion of the mechanism broken away;

Fig. 3 is an end view of the structure of Fig. 1 looking in the direction indicated by broken line 3—3 of Fig. 1;

Fig. 6 is a view with parts shown diagrammatically, parts in elevation and parts in section of control mechanism employed in this invention; and Fig. 7 is an exploded perspective view of mechanical interlocking mechanism employed in the control mechanism of this invention.

Figure 1:
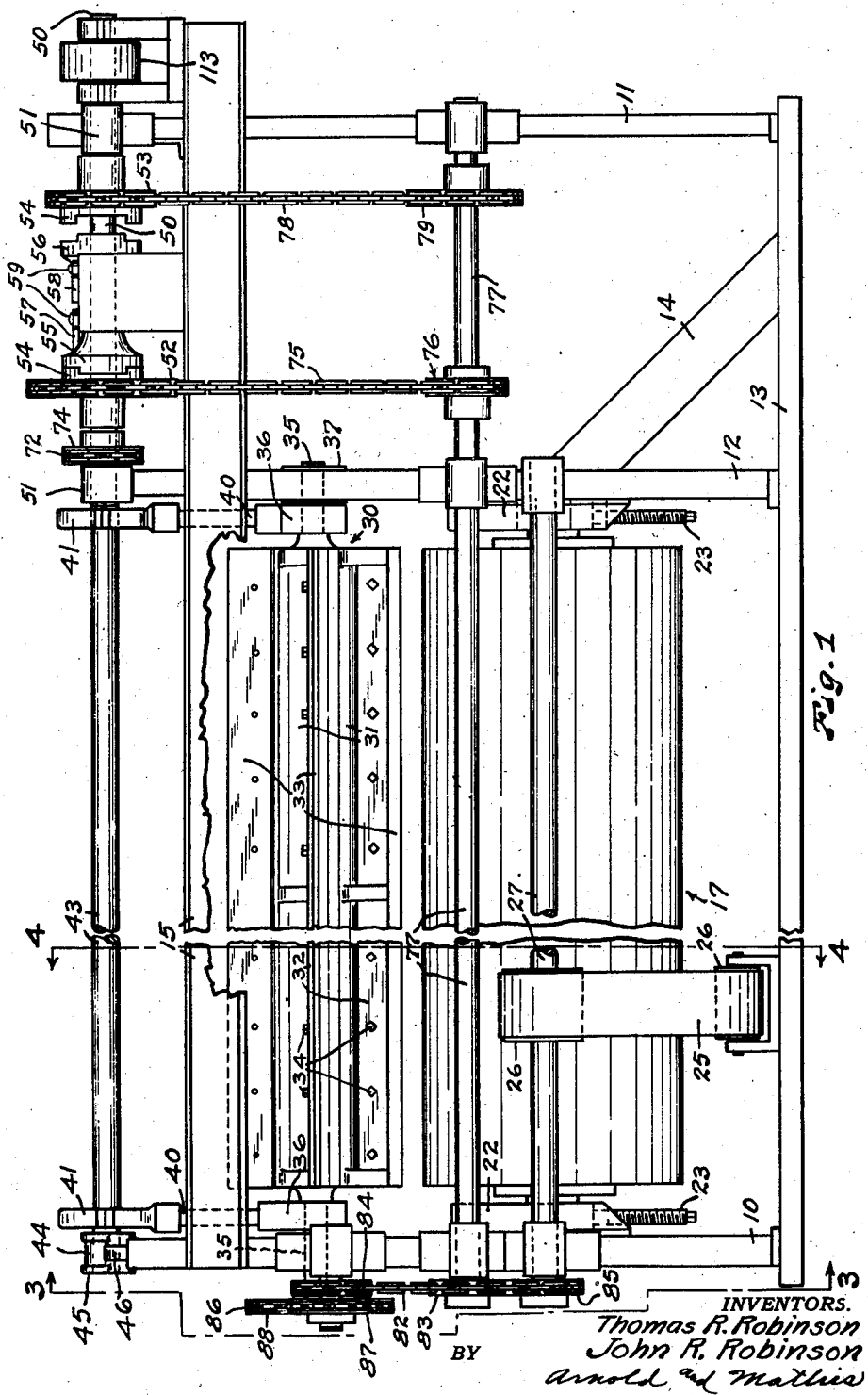
Figure 1 is an elevation looking in the direction of broken line 1—1 of Fig. 2, of a rotary clipper constructed in accordance with this invention, a portion of the machine being broken away and with parts, as the conveyor and supporting sheaves therefor, being omitted.

A typical frame of this machine comprises two spaced apart upright end frame structures 10 and 11 and an intermediate upright frame structure 12 all supported on base frame structure 13 and having diagonal brace members 14 where needed. Transverse frame members, such as channel irons 15 and 16, are secured to the end frame structures 10 and 11 and to the upright frame structure 12 near the upper end portions of said upright frame structures 10, 11 and 12.

A die roll 17 is operatively disposed between the upright frame members 10 and 12 a short distance above the base frame members 13.

The die roll 17 has an external surface constructed of some material that is substantially softer than the cutter knives 33, such as wood blocks 18 positioned so that the grain of the wood is substantially radial as respects the roll, said material being firm enough to cut against but soft enough so that it will not unduly damage the edges of the cutting knives 33. Preferably the die roll 17 is of relatively large diameter and is mounted so that its uppermost peripheral portion is at substantially the same height as the upper surface of conveyors over which the veneer is traveling.

An axial bearing shaft 20 protrudes from each end of the die roll 17 and is journaled in a suitable bearing member 21 carried by the adjacent upright frame structure 10 or 12. Each bearing member 21 is guided between two spaced apart upright guide members 22 that are secured to the adjacent upright frame. An adjusting screw 23, threaded through a support 24, is connected with each bearing member 21 so that each bearing member 21 may be adjusted vertically to properly align the die roll and to provide for correct adjustment between the die roll and the knives 33 of the rotary cutting member.

The die roll 17 is driven at a peripheral speed equal to the lineal travel of the veneer passing thereover, which may be accomplished by an endless driven belt 25 shown in Figs. 1, 3, 4 and 5. The belt 25 is supported on sheaves 26. One of the sheaves 26 is fixedly mounted on a shaft 27 that is driven, as by a link belt 82. The driving means of link belt 82 is synchronized with the veneer conveyor means 80 so as to drive the die roll at substantially the same peripheral speed as the veneer that is being clipped. One of the sheaves 26 preferably has a tensioning spring 28 (Fig. 4) connected therewith to function as a belt tightener for belt 25.

Figure 4:
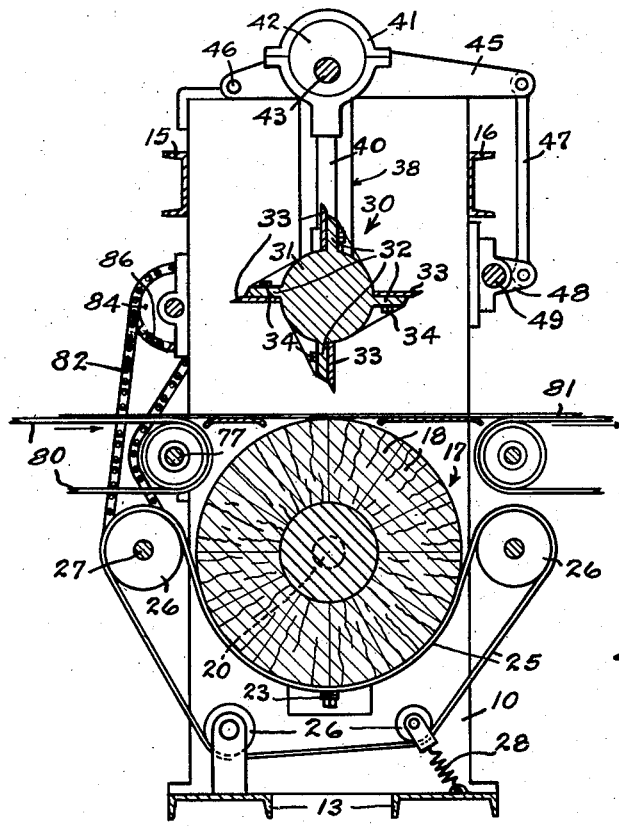
Fig. 4 is a sectional view of the machine taken substantially on broken line 4—4 of Fig. 1 and with fragments of the conveyor means shown.

A rotary cutter, indicated generally by 30, see Fig. 4, is positioned above the die roll 17 in parallel relation thereto for cooperation with said die roll in cutting the veneer. The rotary cutter 30 comprises a body portion 31 having radial flanges 32 to which cutter knives 33 are secured by means such as cap screws 34.

Each end of the rotating knife body 31 is provided with an axial shaft member 35 (see Figs. 1 and 3) that extends through a yoke 36 and is journaled in a bearing block 37. Each bearing block 37 is guided for vertical reciprocation in guide means 38 formed in the upright frame 10 or 12 by which it is supported.

Each bearing yoke 36 is connected by a connecting rod 40 with an eccentric band 41, preferably formed in two parts as shown in Figs. 1 and 4. Each eccentric band 41 is operatively disposed on an eccentric disc 42. The two eccentric discs 42 are mounted on and secured to the same shaft 43. The shaft 43 extends crosswise of the traveling veneer and the end portions of said shaft are journaled in bearings 44 in lever arms 45 (see Fig. 2). One lever arm 45 is positioned above each of the upright frame structures 10 and 12 and one end portion of each lever arm 45 is mounted on a fixed pivot 46. The other end of each lever arm 45 is connected by a link 47 with a lever 48 on a shaft 49. The shaft 49 (see Fig. 3) has another lever arm 100 secured thereto and the lever arm 100 is connected by a connecting rod 101 with a piston 102 (see also Fig. 6) in a pneumatic cylinder forming means 103. Cylinder forming means 103 is pivotally supported by pivot 104 which is supported by frame 105 carried by frame 10. Movement of the lever arms 45 upwardly in response to travel of piston 102 in an upward direction will lift the rotary cutter member 30 clear of the veneer or relatively away from the die roll 17 so that the knives 33 cannot cut and movement of arms 45 downwardly in response to travel of piston 102 in a downward direction will lower rotary cutter member 30 or relatively toward the die roll 17 and into a position where knives 33 may cut. However when member 30 is lowered, operation of the eccentrics 42 will determine which knife or knives 33 will cut as is hereinafter explained.

Piston 102 (Fig. 6) is urged in one direction by fluid, preferably compressed air, in conduit 107 and venting to the atmosphere of air on the opposite side of the piston 102 via conduit 108. Piston 102 is urged in the opposite direction by pressure in conduit 108 and release of pressure in conduit 107. An electrically-spring controlled double valve 109 is preferably employed to control the connection and disconnection of conduits 107 and 108 from a source or tank of compressed air 68 and from discharge to the atmosphere. When solenoid 110 is deenergized, spring 111 will move valve 109 out of the position shown in Fig. 6 and conduit 108 will be connected with tank 68 and conduit 107 vented to the atmosphere and when solenoid 110 is energized as shown in Fig. 6, conduit 107 will be connected with tank 68 and conduit 108 vented to the atmosphere.

Figure 5:
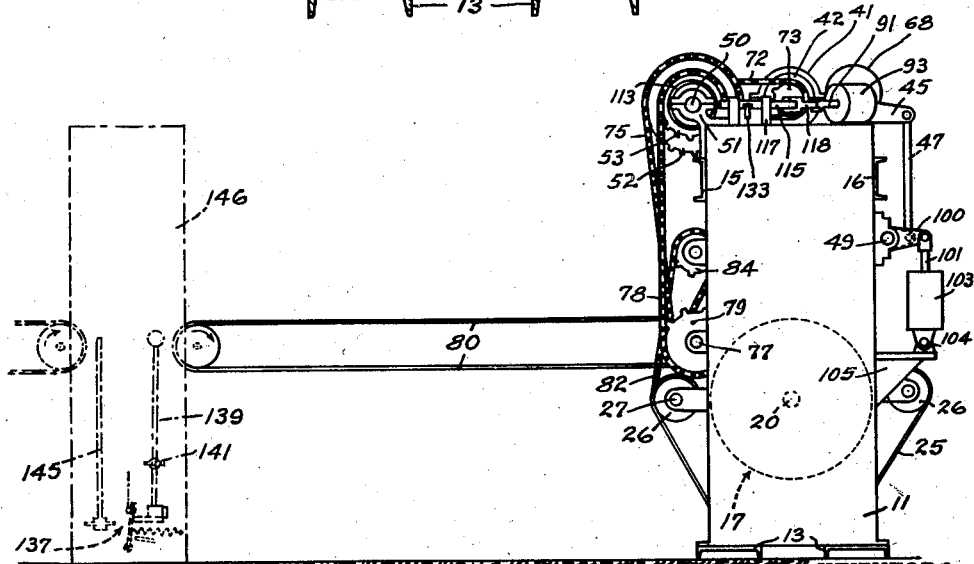
Fig. 5 is an end view, on a smaller scale than the other figures, and looking in the opposite direction to that of Fig. 3, and showing diagrammatically veneer conveyor mechanism and a hand clipper that may be used with this invention.

When the lever arms 45 are held down in the positions shown in Figs. 3, 4, and 5, a knife or the knives 33 will cut when the eccentric 42 is at its lowest point, which is 180° from that shown in Figs. 1, 4, and 5.

The eccentric shaft 43 is driven from a jack shaft 50 (see Figs. 2 and 5) that is positioned to one side of the eccentric shaft 43 and journaled in bearings 51 on the upright frame structures 12 and 11.

The jack shaft 50 is provided with two loosely and rotatively mounted sprocket wheel members 52 and 53 that have clutch jaws 54 rigid therewith. Two clutch members 55 and 56 are splined on the jack shaft 50 in operative positions as respects the clutch jaws 54 of the sprocket wheel members 52 and 53 respectively. The clutch members 55 and 56 are adapted to be selectively moved into and out of engagement with the clutch jaws 54 of the respective sprocket wheel members 52 and 53 by clutch control levers 57 and 58. The clutch control levers 57 and 58 each have one end portion fulcrumed on a fixed pivot means 59. The other end portions of said levers 57 and 58 are respectively connected by connecting rods 60 and 61 with pistons 62 and 63 (see also Fig. 6) in pneumatic cylinders 64 and 106. A spring 65 in each cylinder 64 and 106 yieldingly urges the pistons 62 and 63 into positions to neutralize or disengage the clutch members 55 and 56 from the clutch jaws 54. The levers 57 and 58 are preferably mechanically interlinked by link 69 functioning as a safety means to insure that the pistons 62 and 63 travel in predetermined timed relation.

Air conduits 66 and 67 connect the respective cylinder forming means 64 and 106 with a tank 68 of compressed air. The tank 68 is connected with a suitable source of supply of compressed air by the conduit fragment shown.

Preferably electrically controlled valves 70 and 71 are provided in the respective conduits 66 and 67 and may be controlled from any suitable remote location. Each time one of the valves 70 and 71 transmits pressure from tank 68 and the other exhausts to the atmosphere, the clutch 55 or 56 controlled by said valve will be engaged with its respective sprocket wheel member 52 or 53.

The shaft 43 that carries the eccentric discs 42 is driven from the jack shaft 50 (see Fig. 2) by a link belt 72 that operates on sprocket wheels 73 and 74 on the shaft 43 and jack shaft 50 respectively.

The sprocket wheel member 52, Fig. 1, is driven by a link belt 75 that connects said sprocket wheel member 52 with a sprocket wheel 76 on a driven shaft 77. The driven shaft 77 and conveyor 80 are driven in timed relation from a common source as the motor 143 shown diagrammatically in Fig. 6. In the present example, the sprocket wheel 76 on the driven shaft 77 is half the diameter of the sprocket wheel 52 to provide a one to two driving speed ratio.

The sprocket wheel member 53 on the jack shaft 50 is driven by a link belt 78 that connects said sprocket wheel member 53 with a sprocket wheel 79 on the driven shaft 77 (see Fig. 1). In the present example, the sprocket wheels 53 and 79 are of the same size to provide a one to one driving ratio between the shafts 77 and 50.

The driving arrangement just hereinbefore described provides for driving the eccentric shaft 43 at a predetermined speed when the clutch member 56 is engaged as respects sprocket wheel 53 and the clutch member 55 is disengaged as respects sprocket wheel 52 and for driving said eccentric shaft at one half said predetermined speed when the clutch member 55 is engaged as respects sprocket wheel 52 and the clutch member 56 is disengaged as respects sprocket wheel 53. The speed of rotation of the eccentric shaft 43 determines the frequency of the vertical reciprocations imparted to the rotary cutter 30 and in this way determines the width of cut of the veneer.

Thus in the present example, the peripheral spacing between each of the four knives 33 is one unit, as for example, thirteen inches. If the shaft 43 is in its lowermost position and is not rotating, then each knife 33 will cut and the width of each cut will be one unit or thirteen inches. If the shaft 43 is rotated at the same speed as the rotary cutter 30 (this obtains when clutch 55 engages sprocket wheel 52 with jack shaft 50) then there will be one reciprocation of the rotary cutter 30 in each revolution thereof and the width of the cut will be four units or fifty-two inches. Next, if shaft 43 is rotated at twice the speed as the rotary cutter 30 (this obtains when clutch 56 engages sprocket wheel 53 with jack shaft 50) then there will be two reciprocations of the rotary cutter 30 in each revolution thereof and the width of the cut will be two units or twenty-six inches. Obviously, a unit may be of any desired dimension.

It is to be understood that this invention is also not limited to any number of knives on the cutter 30. There may be for example only one knife on the cutter 30 and then if the shaft 43 is rotated at the same speed as the cutter 30, there will be one cut (the length thereof being the length of the peripheral path of the cutter knife) per revolution of the cutter 30. Next under such circumstances, if the shaft 43 is rotated at one half the speed of the cutter 30, there will be one cut per two revolutions of the cutter 30 and the length will be two units (each unit being the length of the peripheral path of the cutter knife). Also, a multiple number of knives other than four, such as six, may be employed and speeds of one to three or one to two or others between the cutter 30 and the shaft 43 may be employed to provide selective cutting of various units.

The driven shaft 77 is synchronized with and driven from the same source by motor 143 (diagrammatically illustrated in Fig. 6) as endless traveling conveyor 80 (Fig. 5) on which veneer 81 (Fig. 4) to be clipped is fed through the machine. The cutter 30 is driven from the shaft 77 by means of a link belt 82, Fig. 3, operating on sprocket wheels 83, 84, and 85, and another link belt 86 operating on sprocket wheels 87 and 88. The link belt 86 will operate with sufficient slackness to permit the required vertical or reciprocable movement of the cutter 30.

The gear ratio provided by the driving members 82 to 88 inclusive is preferably such as to impart to the cutting edges of the knives a peripheral speed substantially equal to the speed at which the veneer is traveling.

The end portion of the jack shaft 50 shown at the right in Figs. 1 and 2 preferably has a brake drum 112 thereon. A brake band 113 extends around this brake drum 112 for the purpose of frictionally engaging the same. The brake drum 112 has a notch 114 therein for the reception of a locking plunger 115 (see Figs. 2 and 7). An opening 116 may be provided in the brake band 114 through which the plunger 115 may operate.

The plunger 115 is reciprocably supported in guide means 117 and is connected with a bell crank 118 that is mounted on a fulcrum 90. A connecting rod 91 connects the bell crank 118 with a piston 92 (see also Fig. 6) in a pneumatic cylinder 93. A conduit 94 having an electrically actuated valve 95 therein connects the pneumatic cylinder 93 with the pneumatic supply tank 68. A spring 96 yieldingly opposes piston 92 and urges the locking plunger 115 into a retracted position. When air under pressure is admitted to the cylinder 93, it will overcome the force of the spring 96 and urge the locking plunger 115 toward locked position as respects the drum 112. When plunger 115 enters notch 114, this will lock the jack shaft 50 against rotation. The plunger 115 can only enter the notch 114 when the eccentrics 42 are in such a position as to hold the cutter 30 in its lowermost position, and when cutter 30 is locked in said position each knife will cut as the cutter 30 rotates. The brake band 113 is preferable as it will slow down the speed of the jack shaft 50 when clutches 55 and 56 are both in neutral position and then as shaft 43 rotates a portion of a revolution, under the weight of the cutter 30 acting through connecting rod 40 and eccentric 42, the jack shaft 50 will rather slowly move until plunger 115 engages notch 114.

Referring more particularly to Fig. 6, the cylinder 103 has been angularly moved from the position shown in Fig. 2 so that said Fig. 6 may better illustrate diagrammatically the control mechanism employed in this invention. As has been hereinbefore explained the control mechanism for the lever arms 45 comprises valve member 109, piston 102, cylinder 103, conduits 107 and 108, and connecting rod 101. The mechanism that controls proper speed of the shaft 43 to provide a 26-inch cut comprises valve 71, piston 63, cylinder 106, conduit 67, and connecting rod 61. The mechanism that controls proper rotation of shaft 43 to obtain a 52-inch cut comprises valve 70, piston 62, cylinder 64, conduit 66, and connecting rod 60. The mechanism that provides for locking shaft 43 and in turn providing a 13-inch cut comprises valve 95, piston 92, cylinder 93, connecting rod 91, and conduit 94.

A suitable source of electrical energy is provided on conductors 119 and 120. When the control mechanism 121 is in the position shown in Fig. 6 of the drawings, energy from conductor 120 will pass along conductor 122, thence to conductor 123 because of the position of the control mechanism 121, thence through and energizing solenoid 124, and thence the energy will return via conductor 125 to the other source of energy 119. Upon energizing of solenoid 124, the valve mechanism 71 will move to the position shown in Fig. 6 of the drawings so that a source of compressed air 68 will urge piston 63 to the left as respects the showing in Fig. 6 of the drawings and compress spring 65 in cylinder 106. Upon de-energizing of solenoid 124, spring 126 will rotate valve member 71 so that conduit 67 leading from the cylinder 106 will be connected to the atmosphere.

It is to be remembered that connecting rod 61 is connected through control levers 57 and 58 and link 69 with connecting rod 60 so that valve member 71 must connect cylinder 106 with the source 68 and the valve member 70 must exhaust the cylinder 64 to the atmosphere before the parts may assume the position shown in Fig. 6 of the drawings.

When the control mechanism 121 is moved so as to connect conductor 122 with conductor 127, the solenoid 124 will be de-energized and thus valve 71 will move to vent cylinder 106 to the atmosphere and solenoid 128 will be energized. Energizing of solenoid 128 is accomplished by energy leaving conductor 120, thence along conductor 122, thence to conductor 127 (because of the assumed position of the control mechanism 121) thence through solenoid 128 and thence via conductor 129 to the other source of energy 119. Thus by both mechanical and electrical interlinking, only one of the clutch members 55 or 56 may engage with its respective clutch jaws 54.

Also, the cylinder 93 and mechanism connected therewith which controls the operation of a locking plunger 115 for movement into and out of the notch 114 (see Figs. 2 and 7) is mechanically and electrically interlinked in operation with the cylinders 64 and 106 and parts connected therewith.

When the control mechanism 121 is in an upright position as respects Fig. 6, energy will pass from conductor 120, along conductor 122, thence to conductor 130 (because of the assumed position of control mechanism 121) thence through and energizing solenoid 131 and thence via conductor 132 to the other source of energy 119. Energizing of solenoid 131 will move valve 95 to connect source of compressed air 68 with cylinder 93 and compressed air against the piston 92 will tend to urge the connecting rod 91 downwardly (as respects the showing in Fig. 6). Downward movement of the connecting rod 91 will be transmitted through the bell crank 118 and urge the plunger 115 toward the notch 114 in the drum 112. However, we provide a mechanical interlock so that plunger 115 will not move toward the notch 114 unless the clutch members 55 and 56 are disengaged from their clutch jaws 54. This mechanical interlink embodies a link 133 (see Fig. 2) which is pivotally connected at one end with control levers 57—58 and is slidably mounted in a support 134. The link 133 (see also Fig. 7) is provided with a notch 135 therein and the plunger 115 is provided with a notch 136 therein. When the said notches 135 and 136 are in registering relation (which means that the clutch members 55 and 56 are in neutral position as respects their clutch jaws 54) then movement of the plunger 115 toward locking position with the notch 114 is possible. This mechanical interlink between the operation of plunger 115 and the clutch members 55 and 56 eliminates possibility of locking jack shaft 50 when the same is being driven or vice versa.

In view of the fact that the lever arms 45 should be subject to operation regardless of the operative position of the clutch members 55 and 56 and the plunger 115, there is no mechanical or electric interlock between the valve 109 and the valves 95, 70 or 71 or the parts connected with said last mentioned valves. The electrical circuit for the valve 109 which functions to raise and lower arms 45 comprises a switch 137 for connecting source 120 with a conductor 138. Energy on conductor 138 passes through and energizes solenoid 110 and thence connects via conductor 132 with the other source of energy 119. Thus an operator may by movement of switch lever 139 in one plane, close switch 137 and in turn move valve 109 to the position shown in Fig. 6 of the drawings which will cause piston 102 to move downward and such movement will in turn be transmitted to lower the lever arms 45. Upon opening of switch 137, spring 111 will angularly move valve 109 so an operator may cause the arms 45 to move upwardly and the cutter 30 will be raised so that the knives 33 may not cut.

In operation an operator may be hand clipping the veneer 81 with clipper mechanism 146 and lever 145 (Fig. 5) and may have one of the valves 95, 70 or 71 set to cut the desired width and at the same time the switch 137 may be open so that the knives are not in cutting position. Then when the operator desires to cease hand clipping he may close switch 137 and the arms 45 will be moved downwardly and clipping will commence at the predetermined width selected by the said valve 95, 70 or 71. Switch lever 139 also preferably operates another switch mechanism 140 when switch lever 139 is moved in a plane at right angles to the plane in which it was moved to operate switch mechanism 137. This may be accomplished by universal pivot means 141 of well known construction. When switch means 140 is closed, energy from source 120 will pass along conductor 142, through closed switch 140 and motor 143 and thence along conductor 144 to the other source of energy 119. The motor 143 is diagrammatically shown and drives conveyor 80 (see Fig. 5) and the clipping mechanism of this invention. This switch lever 139 may be used to "jog" the conveyor 80 so that by lever 145 (Fig. 5) the standard hand clipper 146 may be operated and the extent of travel of the veneer 81 may be determined. Also, while the hand clipper indicated diagrammatically by 146 is being operated, the operator will move the switch lever 139 in a plane to intermittently operate switch 140 and when the desired width of material is selected, then by operation of the lever 145 the material will be hand clipped. In the meantime while the operator is hand clipping the veneer, the switch 137 will be in open position and thus the cutter 30 will be in inoperative position.

Obviously, changes may be made in the forms, dimensions, and arrangement of the parts of our invention, without departing from the principle thereof, the above setting forth only a preferred form of embodiment.

We claim:

1. In a machine for clipping moving sheet material, a rotary die member; a rotary cutter member having radially projecting blade means; means providing substantailly equal peripheral speeds to said blade means and said die member; pivotally mounted arm means; reciprocating devices carried by said arm means and connected with one of said cutter and die members providing relative movement therebetween; power means, having a plurality of predetermined speeds, connected with said reciprocating devices imparting varying cycles of reciprocation to said reciprocating devices in timed relation with the relative position of the radially projecting blade means and the die member; and selectively operable moving means angularly moving said arm means and thereby relatively moving said blade means and said die member into and cut of operative cutting relation, whereby upon movement of said arm means into one position non-cutting relation obtains between said rotary cutter and said die member and upon movement of arm means into a second position cutting relation obtains between said rotary cutter and said die member and the rate of cutting is determined by the cycles of movement of said reciprocating devices.

2. In a machine for clipping moving sheet material, a rotary die member; a rotary cutter member having radially projecting blade means; means providing substantially equal peripheral speed to said blade means and said die member; reciprocating devices connected with one of said cutter and die members providing relative movement therebetween, and power means, having a plurality of predetermined speeds, connectable with said reciprocating devices imparting varying cycles of reciprocation to said reciprocating devices in timed relation with the relative position of the radially projecting blade means and the die member, said power means comprising a driven shaft connected with said reciprocating devices, a plurality of driving sheaves rotatably mounted on said shaft, and clutch means fixed on the driven shaft and selectively engageable with one of the said driving sheaves, whereby upon operation of said clutch means cutting relation obtains between said rotary cutter and said die member and the rate of cutting is determined by the cycles of movement of said reciprocating devices.

3. In a machine for clipping moving sheet material, a rotary die member; a rotary cutter member having radially projecting blade means; means providing substantially equal peripheral speeds to said blade means and said die member; reciprocating devices connected with one of said cutter and die members providing relative movement therebetween; power means, having a plurality of predetermined speeds, connectable with said reciprocating devices imparting varying cycles of reciprocation to said reciprocating devices in timed relation with the relative position of the radially projecting blade means and the die member; selectively operable means engaging and disengaging the power means and the reciprocating devices; and selectively operable locking means connected with said reciprocating devices for holding the reciprocating devices against reciprocation and holding the one of said cutter and die members connected therewith in a cutting position as respects the one not connected, whereby upon disengagement of the power means from the reciprocating means and the holding of the latter in a predetermined position, the cutter and the die members may be held in a cutting position respecting each other.

4. In a machine for clipping moving sheet material, a rotary die member; a rotary cutter member having radially projecting blade means; means providing substantially equal peripheral speeds to said blade means and said die member; reciprocating devices connected with one of said cutter and die members providing relative movement therebetween; power means, having a plurality of predetermined speeds, connectable with said reciprocating devices imparting varying cycles of reciprocation to said reciprocating devices in timed relation with the relative position of the radially projecting blade means and the die member; selectively operable means engaging and disengaging the power means and the reciprocating devices; and selectively operable locking means, interconnected with the power engaging and disengaging means and operable only when the latter is in disengaged position, connected with said reciprocating devices for holding the reciprocating devices against reciprocation and holding the one of said cutter and die members connected therewith in a cutting position as respects the one not connected, whereby upon disengagement of the power means from the reciprocating means and the holding of the latter in a predetermined position, the cutter and the die members may be held in a cutting position respecting each other.

5. In a machine for clipping moving sheet material, a rotary die member; a rotary cutter member having radially projecting blade means; means providing substantially equal peripheral speeds to said blade means and said die member; material feeding means feeding material between said cutter and die members at a lineal speed substantially equal to the said peripheral speeds; pivotally mounted arm means; reciprocating devices carried by said arm means and connected with one of said cutter and die members providing relative movement therebetween; power means, having a plurality of predetermined speeds, connected with said reciprocating devices imparting varying cycles of reciprocation to said reciprocating devices in timed relation with the relative position of the radially projecting blade means and the die member; and selectively operable control means for angularly moving said arm means and thereby relatively moving said blade means and said die member into and out of operative cutting relation, and for operating said material feeding means, whereby simultaneous control obtains in relatively moving the cutter and die members into and out of cutting relation with operation of the feeding means.

THOMAS R. ROBINSON.
JOHN R. ROBINSON.